United States Patent
Izumi et al.

(10) Patent No.: US 8,076,894 B2
(45) Date of Patent: Dec. 13, 2011

(54) SUPERCONDUCTIVE ROTATING ELECTRIC MACHINE DRIVE CONTROL SYSTEM AND SUPERCONDUCTIVE ROTATING ELECTRIC MACHINE DRIVE CONTROL METHOD

(75) Inventors: Mitsuru Izumi, Tokyo-To (JP); Naoki Maki, Ibaraki-Ken (JP)

(73) Assignee: National University Corporation Tokyo University of Marine Science and Technology, Tokyo-to (JP)

( * ) Notice: Subject to any disclaimer, the term of this patent is extended or adjusted under 35 U.S.C. 154(b) by 415 days.

(21) Appl. No.: 12/513,386

(22) PCT Filed: Oct. 31, 2007

(86) PCT No.: PCT/JP2007/071201
§ 371 (c)(1),
(2), (4) Date: May 4, 2009

(87) PCT Pub. No.: WO2008/056580
PCT Pub. Date: May 15, 2008

(65) Prior Publication Data
US 2010/0066299 A1    Mar. 18, 2010

(30) Foreign Application Priority Data
Nov. 8, 2006 (JP) .................................. 2006-302923

(51) Int. Cl.
*H02P 1/46* (2006.01)
(52) U.S. Cl. ......... 318/716; 318/701; 318/702; 318/718
(58) Field of Classification Search .................. 318/701, 318/702, 716, 717
See application file for complete search history.

(56) References Cited

U.S. PATENT DOCUMENTS

| | | | |
|---|---|---|---|
| 5,801,500 A | * | 9/1998 | Jensen et al. ............. 318/400.09 |
| 6,362,588 B1 | | 3/2002 | Umans et al. |
| 6,650,083 B2 | * | 11/2003 | Jung ............................. 318/701 |

(Continued)

FOREIGN PATENT DOCUMENTS

JP        4-58799        2/1992
(Continued)

OTHER PUBLICATIONS

International Preliminary Report on Patentability and Written Opinion of the International Searching Authority dated Jun. 4, 2009 for International Application No. PCT/JP2007/071201.

(Continued)

*Primary Examiner* — Walter Benson
*Assistant Examiner* — Jorge Carrasquillo
(74) *Attorney, Agent, or Firm* — Wenderoth, Lind & Ponack, L.L.P.

(57) ABSTRACT

The present invention provides a superconductive rotating electric machine drive control system that has higher efficiency and is smaller size and lighter in weight than conventional systems, and also provides a superconductive rotating electric machine drive control method to be implemented in the superconductive rotating electric machine drive control system. By the superconductive rotating electric machine drive control system and the superconductive rotating electric machine drive control method in accordance with the present invention, a control operation is performed so that the field current $I_{f2}$ applied to the superconductive field winding of the synchronous rotating electric machine satisfies an equation for the field current $I_{f2}$ in accordance with the variation of the electric power exchanged between the synchronous rotating electric machine and the power unit.

35 Claims, 6 Drawing Sheets

U.S. PATENT DOCUMENTS

2004/0245949 A1\* 12/2004 Ueda et al. .................... 318/254

FOREIGN PATENT DOCUMENTS

| JP | 2004-135477 | 4/2004 |
| JP | 2004-282979 | 10/2004 |
| JP | 2004282979 A \* | 10/2004 |
| JP | 2005-237175 | 9/2005 |

OTHER PUBLICATIONS

International Search Report mailed Jan. 22, 2008 for International Application No. PCT/JP2007/071201.

\* cited by examiner

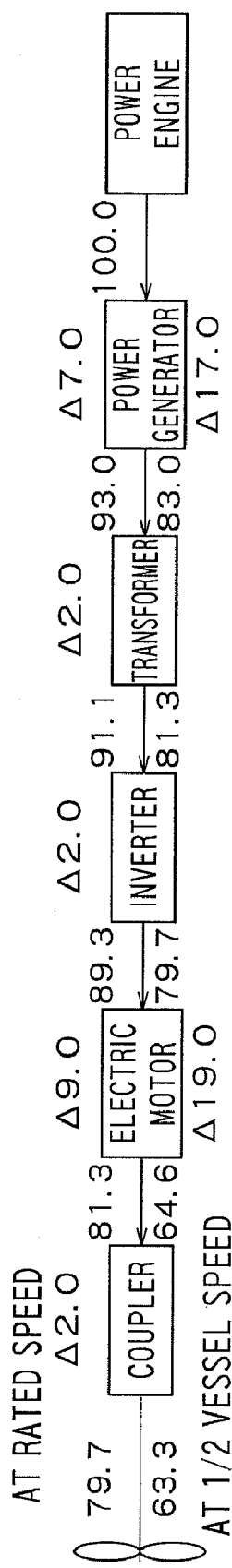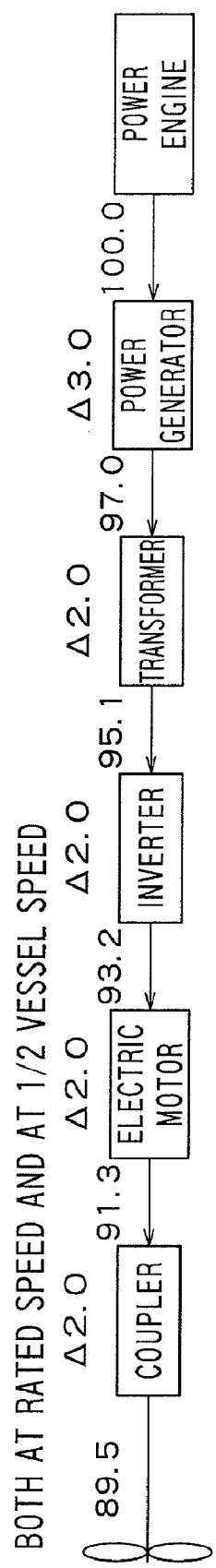
FIG. 6 (a)
FIG. 6 (b)

SUPERCONDUCTIVE ROTATING ELECTRIC MACHINE DRIVE CONTROL SYSTEM AND SUPERCONDUCTIVE ROTATING ELECTRIC MACHINE DRIVE CONTROL METHOD

BACKGROUND OF THE INVENTION

1. Field of the Invention

The present invention relates to a superconductive rotating electric machine drive control system and a superconductive rotating electric machine drive control method to be used mainly in ships required to have low-speed large torque, as well as in wind-power generation, railroads, automobiles, power generation and industrial auxiliary machines, and the likes.

2. Related Art

Recently, attention is drawn to ships called "super-eco ships" having electric propulsion systems of environmental load reducing types. Those are ships of a new concept that achieve a high degree of freedom in placement by employing novel vessel shapes, contra-rotating propellers, and electric propulsion systems. By virtue of those techniques, the "super-eco ships" are being widely used.

FIG. 5 is a block diagram showing the structure of an electric propulsion system provided in a super-eco ship.

This electric propulsion system includes a rotating electric machine 1, a power supply unit 3 that supplies DC power, a power converting device 5 such as an inverter that converts the DC power supplied from the power supply unit 3 to AC power, and supplies the AC power to the rotating electric machine 1, a pushing propeller 6 that is connected directly to the rotating electric machine 1, and a field power supply 7 that supplies a field current to the rotating electric machine 1.

To achieve high efficiency, a synchronous motor formed with a rotating field winding 1a and a stationary armature winding 1b is used as the rotating electric machine 1, and the power supply unit 3 is normally formed with a power generator 3a and a power engine 3b connected to each other.

Unlike a conventional directly-connected propulsion machine that increases and reduces the output of a power engine so as to increase and reduce the propulsion power of the pushing propeller, the electric propulsion system shown in FIG. 5 operates the power engine on maximum output at all times (not shown in FIG. 5, see FIG. 6 instead), and increases and reduces the electric power to be supplied to the rotating electric machine 1 with the power converting device 5, so as to increase and reduce the propulsion power of the pushing propeller.

In this electric propulsion system, the output of the power engine is always kept at a fixed value. Accordingly, compared with a conventional directly-connected propulsion machine, this electric propulsion system can restrict the toxic substance emission such as carbon dioxide emission to a much smaller amount, and can reduce the adverse influence on environments.

However, unlike a conventional directly-connected propulsion machine, this electric propulsion system uses a motor, a power generator, and a power converting device. Therefore, this electric propulsion system has lower transmission efficiency than a conventional directly-connected propulsion machine.

FIG. 6(a) is a schematic block diagram showing the transmission efficiency of the conventional electric propulsion system shown in FIG. 5. In FIG. 6(a), each of the values having the symbol Δ attached thereto represents a loss (%), and each of the values not having the symbol Δ attached thereto represents transmission efficiency (%). The numerical values shown on the upper side in FIG. 6(a) represent the transmission efficiency (%) at a rated speed, and the numerical values shown on the lower side in FIG. 6(a) represent the transmission efficiency (%) at a ½ vessel speed.

As shown in FIG. 6(a), the transmission efficiency of 79.7% at the rated speed, and the transmission efficiency of 63.3% at the ½ vessel speed are not sufficiently high, from a viewpoint of energy saving.

The low transmission efficiency is mainly due to the rotating electric machine serving as a power generator or a motor having low transmission efficiency.

Therefore, the transmission efficiency of the entire electric propulsion system is expected to become higher by increasing the transmission efficiency of the rotating electric machine serving as a power generator or a motor.

In a case where the rotating electric machine 1 of FIG. 5 is used as a wind-power generator, a load device 4 such as an industrial motor or a general electric power supply unit, instead of the power supply unit 3, is connected in the power unit 2. In this case, however, low-speed large torque is also required. Therefore, the rotating electric machine serving as a power generator or a motor is required to have higher transmission efficiency.

In a case where low-speed large torque is required as in a ship electric propulsion motor or a wind-power generator or the like, the rotating electric machine becomes a low-voltage, large-current rotating electric machine, having a small induced electromotive force.

Accordingly, in the conventional electric propulsion system shown in FIG. 5, the copper loss increases, and the transmission efficiency becomes much lower, as the armature current increases. Also, since the heat generation from the armature winding increases, it is necessary to make the refrigerating unit larger in size, which is disadvantageous.

To achieve higher transmission efficiency and easy refrigeration, the current density of the armature winding may be lowered. In such a case, however, the rotating electric machine becomes larger in size, and therefore, there is a limit to the decrease in the current density.

As a conventional technique, there has been an invention of a motor having higher outputs without an increase in power supply capacity. However, such an invention does not solve the problem of low transmission efficiency (see Japanese Patent Laid Open 2005-237175, for example).

SUMMARY OF THE INVENTION

The present invention has been made in view of these circumstances, and an object thereof is to provide a superconductive rotating electric machine drive control system that has higher efficiency and is smaller size and lighter in weight than conventional systems, and also to provide a superconductive control method to be implemented in the superconductive rotating electric machine drive control system.

According to a first aspect of the present invention, there is provided a superconductive rotating electric machine drive control system including: a synchronous rotating electric machine that has a superconductive field winding and a copper armature winding or a superconductive armature winding; a power unit provided as a power supply unit that supplies power to the synchronous rotating electric machine or as a load unit that receives power from the synchronous rotating electric machine; an armature-side power converting device that converts electric power exchanged between the synchronous rotating electric machine and the power unit; a field power supply that supplies a field current to the synchronous rotating electric machine; a field-side power converting device that controls the current supplied from the field power supply to the superconductive field winding; an unified controller that coordinately controls the direct or alternating current flowing in the superconductive field winding and the copper armature winding or superconductive armature winding; and a refrigerating unit that cools down the superconductive field winding or both the superconductive field winding and the superconductive armature winding to a very low temperature, wherein, when the synchronous rotating electric machine is used as a synchronous motor, the unified controller performs a control operation so that a field current $I_{f2}$ applied to the superconductive field winding of the synchronous rotating electric machine satisfies the following equation (11) in accordance with the variation of the electric power exchanged between the synchronous rotating electric machine and the power unit:

$$I_{f2}=E_2/k_4n_2v=\sqrt{(V_t\cos\theta-r_2I)^2+(V_t\sin\theta-x_2I)^2}/k_4n_2v \quad (11)$$

where $I_{f2}$ represents the field current applied to the superconductive field winding, I represents the line current, $E_2$ represents the induced electromotive force of the synchronous rotating electric machine, $V_t$ represents the terminal voltage, $k_4$ represents the constant, $n_2$ represents the number of winding wires in the superconductive field winding, $v$ represents the rotation speed of the synchronous rotating electric machine, represents the power factor angle, $r_2$ represents the resistance of the synchronous rotating electric machine, and $\chi_2$ represent the reactance of the synchronous rotating electric machine.

In the first aspect of the present invention, the unified controller may perform a control operation so that the field current $I_{f2}$ applied to the superconductive field winding satisfies the following equation (16):

$$I_{f2}=(\sqrt{V_t^2-x_2^2I^2}-r_2I)/k_4n_2v \quad (16)$$

the equation (16) being satisfied so that the induced electromotive force E2 of the synchronous rotating electric machine and the armature current I flowing in the copper armature winding or superconductive armature winding are always in phase.

Alternatively, in the first aspect of the present invention, the unified controller may perform a control operation so that the field current $I_{f2}$ applied to the superconductive field winding satisfies the following equation (18):

$$I_{f2}=E_2/k_4n_2v=\sqrt{(V_t-r_2I)^2+(-x_2I)^2}/k_4n_2v \quad (18)$$

the equation (18) being satisfied so that the power factor of the synchronous rotating electric machine is always 1 (cos θ=1).

According to a second aspect of the present invention, there is provided a superconductive rotating electric machine drive control system including: a synchronous rotating electric machine that has a superconductive field winding and a copper armature winding or a superconductive armature winding; a power unit provided as a power supply unit that supplies power to the synchronous rotating electric machine or as a load unit that receives power from the synchronous rotating electric machine; an armature-side power converting device that converts electric power exchanged between the synchronous rotating electric machine and the power unit; a field power supply that supplies a field current to the synchronous rotating electric machine; a field-side power converting device that controls the current supplied from the field power supply to the superconductive field winding; an unified controller that coordinately controls the direct or alternating current flowing in the superconductive field winding and the copper armature winding or superconductive armature winding; and a refrigerating unit that cools down the superconductive field winding or both the superconductive field winding and the superconductive armature winding to a very low temperature, wherein, when the synchronous rotating electric machine is used as a synchronous motor, the unified controller performs a control operation so that field currents $I_{f1}$ and $I_{f2}$ respectively applied to the field winding of the power supply unit and the superconductive field winding of the synchronous rotating electric machine satisfy the following equations (11) and (12) in accordance with the variation of the electric power exchanged between the synchronous rotating electric machine and the power unit:

$$I_{f2}=E_2/k_4n_2v=\sqrt{(V_t\cos\theta-r_2I)^2+(V_t\sin\theta-x_2I)^2}/k_4n_2v \quad (11)$$

$$I_{f1}=E_1/k_3n_1v=\sqrt{(V_t\cos\theta+r_2I)^2+(V_t\sin\theta+x_2I)^2}/k_3n_1v \quad (12)$$

where $I_{f1}$ and $I_{f2}$ represent the field currents respectively applied to the field winding of the power supply unit and the superconductive field winding, I represents the line current, $E_1$ and $E_2$ represent the induced electromotive forces of the power supply unit and the synchronous rotating electric machine, $V_t$ represents the terminal voltage, $k_3$ and $k_4$ represent the constants, $n_1$ and $n_2$ represent the numbers of winding wires in the field winding of the power supply unit and the superconductive field winding of the synchronous rotating electric machine, $v$ represents the rotation speed of the synchronous rotating electric machine, θ represents the power factor angle, $r_1$ and $r_2$ respectively represent the resistance of the power supply unit and the resistance of the synchronous rotating electric machine, and $\chi_1$ and $\chi_2$ respectively represent the reactance of the power supply unit and the reactance of the synchronous rotating electric machine.

In the second aspect of the present invention, the unified controller may perform a control operation so that the field currents $I_{f1}$ and $I_{f2}$ respectively applied to the field winding of the power supply unit and the superconductive field winding of the synchronous rotating electric machine satisfy the following equations (16) and (17):

$$I_{f2}=(\sqrt{V_t^2-x_2^2I^2}-r_2I)/k_4n_2v \quad (16)$$

$$I_{f1}=\sqrt{(E_t^2+(r_1+r_2)I)^2+(x_1+x_2)^2I^2}/k_3n_1v \quad (17)$$

the equations (16) and (17) being satisfied so that the induced electromotive force $E_2$ of the synchronous rotating electric machine and the armature current I flowing in the copper armature winding or superconductive armature winding are always in phase.

Alternatively, in the second aspect of the present invention, the unified controller may perform a control operation so that the field currents $I_{f1}$ and $I_{f2}$ respectively applied to the field winding of the power supply unit and the superconductive field winding of the synchronous rotating electric machine satisfy the following equations (18) and (19):

$$I_{f2}=E_2/k_4n_2v=\sqrt{(V_t-r_2I)^2+(-x_2I)^2}/k_4n_2v \quad (18)$$

$$I_{f1}=E_1/k_3n_1v=\sqrt{(V_t+r_1I)^2+(x_1I)^2}/k_3n_1 \quad (19)$$

the equations (18) and (19) being satisfied so that the power factor of the synchronous rotating electric machine is always 1 (cos θ=1).

According to a third aspect of the present invention, there is provided a superconductive rotating electric machine drive control system including: a synchronous rotating electric machine that has a superconductive field winding and a copper armature winding or a superconductive armature winding; a power unit provided as a power supply unit that supplies power to the synchronous rotating electric machine or as a load unit that receives power from the synchronous rotating electric machine; an armature-side power converting device that converts electric power exchanged between the synchronous rotating electric machine and the power unit; a field power supply that supplies a field current to the synchronous rotating electric machine; a field-side power converting device that controls the current supplied from the field power supply to the superconductive field winding; an unified controller that coordinately controls the direct or alternating current flowing in the superconductive field winding and the copper armature winding or superconductive armature winding; and a refrigerating unit that cools down the superconductive field winding or both the superconductive field winding and the superconductive armature winding to a very low temperature, wherein, when the synchronous rotating electric machine is used as a power generator, the unified controller performs a control operation so that a field current $I_{f2}$ applied to the superconductive field winding satisfies the following equation (20) in accordance with the variation of the electric power exchanged between the synchronous rotating electric machine and the power unit:

$$I_{f2} = \sqrt{(V_t\cos\theta + r_2 I)^2 + (V_t\sin\theta + x_2 I)^2} / k_4 n_2 v \tag{20}$$

where $I_{f2}$ represents the field current applied to the superconductive field winding, I represents the line current, $V_t$ represents the terminal voltage, $k_4$ represents the constant, $n_2$ represents the number of winding wires in the superconductive field winding, v represents the rotation speed of the synchronous rotating electric machine, θ represents the power factor angle, $r_2$ represents the resistance of the synchronous rotating electric machine, and $\chi_2$ represent the reactance of the synchronous rotating electric machine.

In each of the aspects of the present invention, the power supply unit may be formed with a copper power generator or a superconductive power generator and a power engine connected to each other.

Each of the aspects of the present invention, the superconductive rotating electric machine drive control system may further include a superconductive transformer that has at least a superconductive winding as the winding on the synchronous rotating electric machine side, and variably adjusts the voltage. This superconductive transformer may be placed between the synchronous rotating electric machine and the armature-side power converting device.

Each of the aspects of the present invention, the superconductive rotating electric machine drive control system may further include a power converting device that includes an inverter, a converter, or a cyclo-converter. This power converting device may be placed on the synchronous rotating electric machine side of the superconductive transformer or on the opposite side of the superconductive transformer from the synchronous rotating electric machine side.

Each of the aspects of the present invention, the superconductive rotating electric machine drive control system may further include an inductive power collector that has a superconductive coil on the rotor side and includes a rotary transformer that variably adjusts the voltage. This inductive power collector may be placed between the field power supply and the field-side power converting device.

Each of the aspects of the present invention, the superconductive rotating electric machine drive control system may further include a power converting device that includes an inverter, a converter, or a cyclo-converter. This power converting device may be placed on the rotor or stator side of the inductive power collector.

The power converting device provided on the rotor side of the inductive power collector may be an AC/DC converter.

Each of the aspects of the present invention, the superconductive rotating electric machine drive control system may further include a propeller that is connected to the synchronous rotating electric machine.

According to a fourth aspect of the present invention, there is provided a superconductive rotating electric machine drive control method implemented in a superconductive rotating electric machine drive control system, the superconductive rotating electric machine drive control system including: a synchronous rotating electric machine that has a superconductive field winding and a copper armature winding or a superconductive armature winding; a power unit provided as a power supply unit that supplies power to the synchronous rotating electric machine or as a load unit that receives power from the synchronous rotating electric machine; an armature-side power converting device that converts electric power exchanged between the synchronous rotating electric machine and the power unit; a field power supply that supplies a field current to the synchronous rotating electric machine; a field-side power converting device that controls the current supplied from the field power supply to the superconductive field winding; an unified controller that coordinately controls the direct or alternating current flowing in the superconductive field winding and the copper armature winding or superconductive armature winding; and a refrigerating unit that cools down the superconductive field winding or both the superconductive field winding and the superconductive armature winding to a very low temperature, when the synchronous rotating electric machine is used as a synchronous motor, the superconductive rotating electric machine drive control method including: performing a control operation with the use of the unified controller, so that a field current $I_{f2}$ applied to the superconductive field winding of the synchronous rotating electric machine satisfies the following equation (11) in accordance with the variation of the electric power exchanged between the synchronous rotating electric machine and the power unit:

$$I_{f2} = E_2/k_4 n_2 v = \sqrt{(V_t\cos\theta - r_2 I)^2 + (V_t\sin\theta - x_2 I)^2}/k_4 n_2 v \tag{11}$$

where $I_{f2}$ represents the field current applied to the superconductive field winding, I represents the line current, $E_2$ represents the induced electromotive force of the synchronous rotating electric machine, $V_t$ represents the terminal voltage, $k_4$ represents the constant, $n_2$ represents the number of winding wires in the superconductive field winding, v represents the rotation speed of the synchronous rotating electric machine, θ represents the power factor angle, $r_2$ represents the resistance of the synchronous rotating electric machine, and $\chi_2$ represent the reactance of the synchronous rotating electric machine.

In the fourth aspect of the present invention, a control operation may be performed with the use of the unified controller, so that the field current $I_{f2}$ applied to the superconductive field winding satisfies the following equation (16):

$$I_{f2} = (\sqrt{V_t^2 - x_2^2 I^2} - r_2 I)/k_4 n_2 v \tag{16}$$

the equation (16) being satisfied so that the induced electromotive force $E_2$ of the synchronous rotating electric machine and the armature current I flowing in the copper armature winding or superconductive armature winding are always in phase.

Alternatively, in the fourth aspect of the present invention, a control operation may be performed with the use of the unified controller, so that the field current $I_{f2}$ applied to the superconductive field winding satisfies the following equation (18):

$$I_{f2}=E_2/k_4n_2v=\sqrt{(V_t-r_2I)^2+(-x_2I)^2}/k_4n_2v \quad (18)$$

the equation (18) being satisfied so that the power factor of the synchronous rotating electric machine is always 1 (cos θ=1).

According to a fifth aspect of the present invention, there is provided a superconductive rotating electric machine drive control method implemented in a superconductive rotating electric machine drive control system, the superconductive rotating electric machine drive control system including: a synchronous rotating electric machine that has a superconductive field winding and a copper armature winding or a superconductive armature winding; a power unit provided as a power supply unit that supplies power to the synchronous rotating electric machine or as a load unit that receives power from the synchronous rotating electric machine; an armature-side power converting device that converts electric power exchanged between the synchronous rotating electric machine and the power unit; a field power supply that supplies a field current to the synchronous rotating electric machine; a field-side power converting device that controls the current supplied from the field power supply to the superconductive field winding; an unified controller that coordinately controls the direct or alternating current flowing in the superconductive field winding and the copper armature winding or superconductive armature winding; and a refrigerating unit that cools down the superconductive field winding or both the superconductive field winding and the superconductive armature winding to a very low temperature, when the synchronous rotating electric machine is used as a synchronous motor, the superconductive rotating electric machine drive control method including: performing a control operation with the use of the unified controller, so that field currents $I_{f1}$ and $I_{f2}$ respectively applied to a field winding of the power supply unit and the superconductive field winding of the synchronous rotating electric machine satisfy the following equations (11) and (12) in accordance with the variation of the electric power exchanged between the synchronous rotating electric machine and the power unit:

$$I_{f2}=E_2/k_4n_2v=\sqrt{(V_t\cos\theta-r_2I)^2+(V_t\sin\theta-x_2I)^2}/k_4n_2v \quad (11)$$

$$I_{f1}=E_1/k_3n_1v=\sqrt{(V_t\cos\theta+r_2I)^2+(V_t\sin\theta+x_2I)^2}/k_3n_1v \quad (12)$$

where $I_{f1}$ and $I_{f2}$ represent the field currents respectively applied to the field winding of the power supply unit and the superconductive field winding, I represents the line current, $E_1$ and $E_2$ represent the induced electromotive forces of the power supply unit and the synchronous rotating electric machine, $V_t$ represents the terminal voltage, $k_3$ and $k_4$ represent the constants, $n_1$ and $n_2$ represent the numbers of winding wires in the field winding of the power supply unit and the superconductive field winding of the synchronous rotating electric machine, v represents the rotation speed of the synchronous rotating electric machine, θ represents the power factor angle, $r_1$ and $r_2$ respectively represent the resistance of the power supply unit and the resistance of the synchronous rotating electric machine, and $\chi_1$ and $\chi_2$ respectively represent the reactance of the power supply unit and the reactance of the synchronous rotating electric machine.

In the fifth aspect of the present invention, a control operation may be performed with the use of the unified controller, so that the field currents $I_{f1}$ and $I_{f2}$ respectively applied to the field winding of the power supply unit and the superconductive field winding of the synchronous rotating electric machine satisfy the following equations (16) and (17):

$$I_{f2}=(\sqrt{V_t^2-x_2^2I^2}-r_2I)/k_4n_2v \quad (16)$$

$$I_{f1}=\sqrt{(E_t^2+(r_1+r_2)I)^2+(x_1+x_2)^2I^2)}/k_3n_1v \quad (17)$$

the equations (16) and (17) being satisfied so that the induced electromotive force $E_2$ of the synchronous rotating electric machine and the armature current I flowing in the copper armature winding or superconductive armature winding are always in phase.

Alternatively, in the fifth aspect of the present invention, a control operation may be performed with the use of the unified controller, so that the field currents $I_{f1}$ and $I_{f2}$ respectively applied to the field winding of the power supply unit and the superconductive field winding of the synchronous rotating electric machine satisfy the following equations (18) and (19):

$$I_{f2}=E_2/k_4n_2v=\sqrt{(V_t-r_2I)^2+(-x_2I)^2}/k_4n_2v \quad (18)$$

$$I_{f1}=E_1/k_3n_1v=\sqrt{(V_t+r_1I)^2+(x_1I)^2}/k_3n_1 \quad (19)$$

the equations (18) and (19) being satisfied so that the power factor of the synchronous rotating electric machine is always 1 (cos θ=1).

According to a sixth aspect of the present invention, there is provided a superconductive rotating electric machine drive control method implemented in a superconductive rotating electric machine drive control system, the superconductive rotating electric machine drive control system including: a synchronous rotating electric machine that has a superconductive field winding and a copper armature winding or a superconductive armature winding; a power unit provided as a power supply unit that supplies power to the synchronous rotating electric machine or as a load unit that receives power from the synchronous rotating electric machine; an armature-side power converting device that converts electric power exchanged between the synchronous rotating electric machine and the power unit; a field power supply that supplies a field current to the synchronous rotating electric machine; a field-side power converting device that controls the current supplied from the field power supply to the superconductive field winding; an unified controller that coordinately controls the direct or alternating current flowing in the superconductive field winding and the copper armature winding or superconductive armature winding; and a refrigerating unit that cools down the superconductive field winding or both the superconductive field winding and the superconductive armature winding to a very low temperature, when the synchronous rotating electric machine is used as a power generator, the superconductive rotating electric machine drive control method including performing a control operation with the use of the unified controller, so that a field current $I_{f2}$ applied to the superconductive field winding satisfies the following equation (20) in accordance with the variation of the electric power exchanged between the synchronous rotating electric machine and the power unit:

$$I_{f2}=\sqrt{(V_t\cos\theta+_2I)^2+(V_t\sin\theta+x_2I)^2}/k_4n_2v \quad (20)$$

where $I_{f2}$ represents the field current applied to the superconductive field winding, I represents the line current, $V_t$ represents the terminal voltage, $k_4$ represents the constant, $n_2$ represents the number of winding wires in the superconductive field winding, v represents the rotation speed of the synchronous rotating electric machine, θ represents the power factor angle, $r_2$ represents the resistance of the synchronous rotating electric machine, and $\chi_2$ represent the reactance of the synchronous rotating electric machine.

BRIEF DESCRIPTION OF THE DRAWINGS

FIG. 6(a) is a schematic block diagram showing the transmission efficiency of the conventional electric propulsion system shown in FIG. 5; and FIG. 6(b) is a schematic block diagram showing the transmission efficiency of the superconductive rotating electric machine drive control system in accordance with the embodiment of the present invention in which the superconductive rotating electric machine drive control method in accordance with the embodiment of the present invention is implemented.

DETAILED DESCRIPTION OF THE INVENTION

The following is a description of a superconductive rotating electric machine drive control system and a superconductive rotating electric machine drive control method in accordance with an embodiment of the present invention, with reference to the accompanying drawings.

Figure 1:
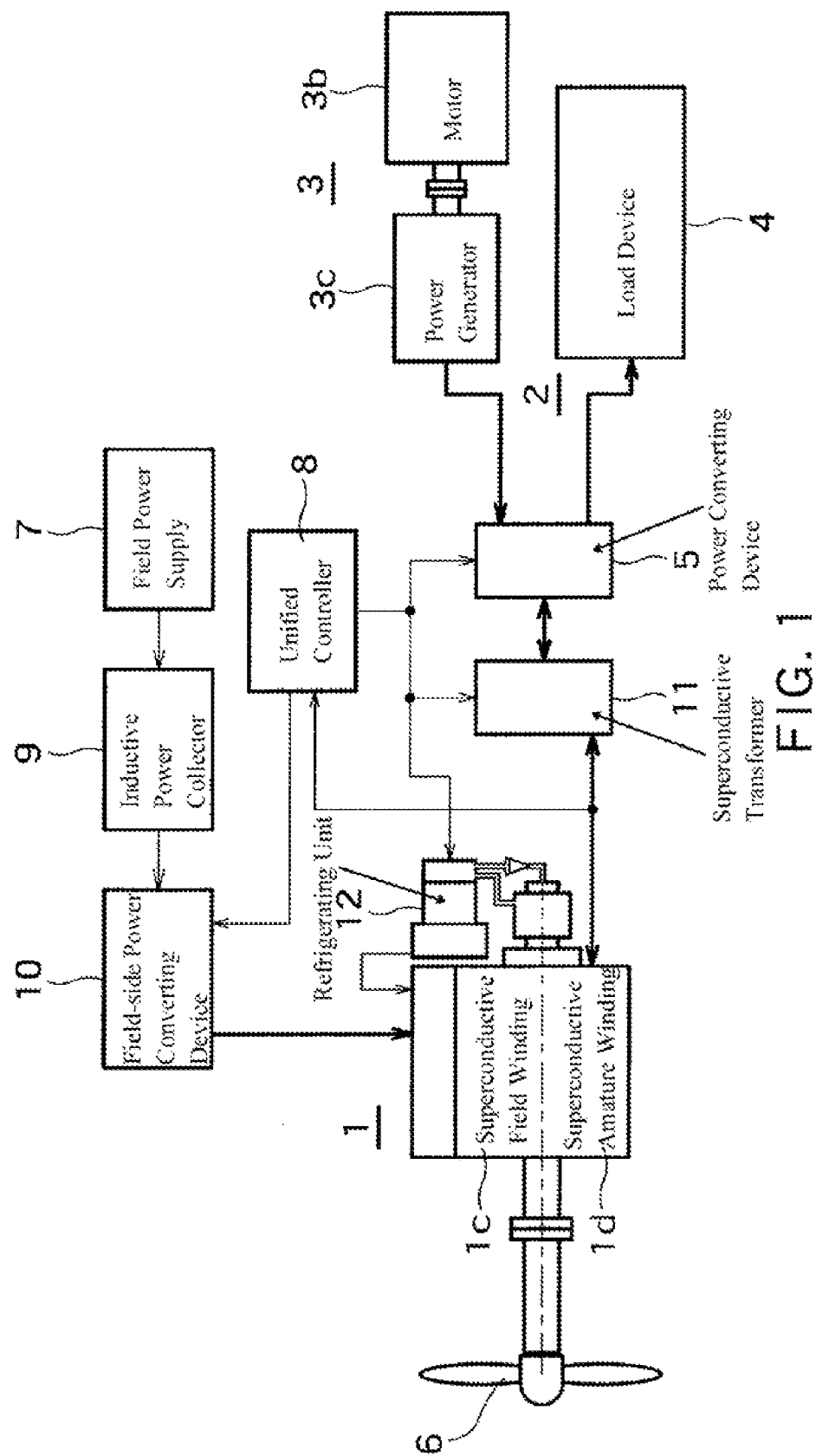
FIG. 1 is a block diagram showing the structure of a superconductive rotating electric machine drive control system in accordance with an embodiment of the present invention in which a superconductive rotating electric machine drive control method in accordance with an embodiment of the present invention is implemented.

FIG. 1 is a block diagram showing the structure of the superconductive rotating electric machine drive control system that has the superconductive rotating electric machine drive control method implemented therein.

The superconductive rotating electric machine drive control system in accordance with the embodiment of the present invention includes: a synchronous rotating electric machine 1 that has a superconductive field winding 1c and a copper armature winding or a superconductive armature winding 1d; a power unit 2 provided as a power supply unit 3 that supplies power to the synchronous rotating electric machine 1 or as a load unit 4 that receives power from the synchronous rotating electric machine 1; an armature-side power converter device 5 such as an inverter, a converter, or a cyclo-converter that converts the power exchanged between the synchronous rotating electric machine 1 and the power unit 2; a field power supply 7 that supplies a field current to the synchronous rotating electric machine 1; a field-side power converting device 10 such as an inverter, a converter, or a cycle-converter that controls the current supplied from the field power supply 7 to the superconductive field winding 1c; an unified controller 8 that controls the direct or alternating current flowing in the superconductive field winding 1c and the copper armature winding or the superconductive armature winding 1d; and a refrigerating unit 12 that cools down the superconductive field winding 1c and the superconductive armature winding 1d to a very low temperature.

The unified controller 8 in which the superconductive rotating electric machine drive control method of this embodiment performs a control operation so that the field current flowing in the superconductive field winding 1c of the synchronous rotating electric machine 1 satisfies the later mentioned equation (11), in accordance with the variation of the electric power exchanged between the synchronous rotating electric machine 1 and the power unit 2, or the output fluctuation. Therefore, the value of the power exchanged between the synchronous rotating electric machine 1 and the power unit 2 is fed back to the unified controller 8.

A propeller 6 may be connected to the synchronous rotary electric machine 1, for example.

The power supply unit 3 is normally formed with a copper power generator or a superconductive power generator 3c and a motor 3b.

As will be described later, it is preferable to provide an inductive power collector 9 of a rotary transformer type that variably adjusts the voltage between the field power unit 7 and the field-side power converter device 10, or a superconductive transformer 11 that variably adjusts the voltage between the synchronous rotating electric machine 1 and the armature-side power converting device 5. The superconductive transformer 11 has at least a superconductive winding as the winding on the side of the synchronous rotating electric machine 1, and the winding on the side of the armature-side power converting device 5 may be either a superconductive winding or a copper winding. Also, as will be described later, a power converting device may be further provided on the side of the rotor or stator of the superconductive transformer 11.

Figure 2:
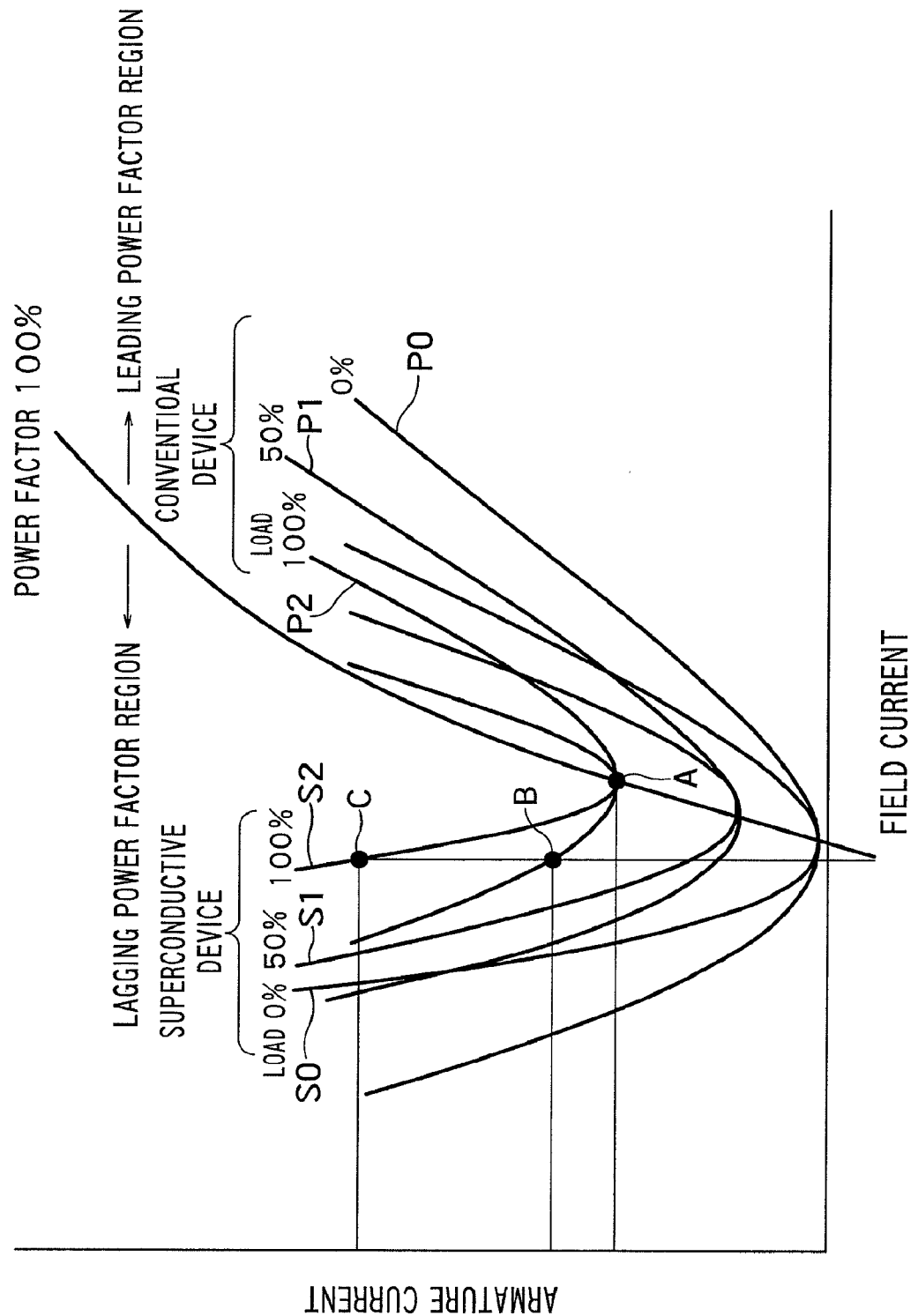
FIG. 2 is a graph showing the V characteristics representing the relationship between the field current and the armature current of each of a superconductive device and a conventional device.

FIG. 2 is a graph showing the V characteristics representing the relationship between the field current and the armature current of each of a superconductive device and a conventional device. The curves S0, S1, and S2 represent the V characteristics of the superconductive device when the load is 0%, 50%, and 100%. The curves P0, P1, and P2 represent the V characteristics of the conventional device when the load is 0%, 50%, and 100%.

As can be seen the graph shown in FIG. 2, in either case, it is preferable that the power factor is 100%, as the armature current becomes highest when the power factor is 100%.

However, when the field current becomes higher, each of the curves shifts to the leading power factor region. When the field current becomes lower, each of the curves shifts to the lagging power factor region. The armature current becomes higher both in the leading power factor region and the lagging power factor region.

As the load increased from 0% to 50% to 100%, the armature currents of both the superconductive device and the conventional device become higher, and changes are caused in the power factors.

In the case of the conventional device, the armature current gently changes as the field current changes. Accordingly, the V curves of the conventional device are gentle curves, as indicated by the curves P0, P1, and P2.

In the case of the superconductive device, the synchronous reactance is small. Accordingly, the armature current rapidly changes as the field current varies. As indicated by the curves S0, S1, and S2, the V curves of the superconductive device are steep curves.

If the load changes from 0% to 100% when the field current is constant, the operating point of the conventional device shifts to point B, and the operating point of the superconductive device shifts to point C.

To maintain the power factor at 100%, the operating point needs to be controlled to stay at point A. In the case of the conventional device, the increase in the armature current is as small as (armature current at point B)/(armature current at point A)=1.2 (times). Accordingly, there is no need to control the field current.

In the case of the superconductive device, however, the increase in the armature current is very large, being (armature current at point C)/(armature current at point A)=2.0 (times). Therefore, to maintain the power factor at 100%, the field current is controlled so that the operating point approximates point A, more preferably, reaches the point A.

Figure 3:
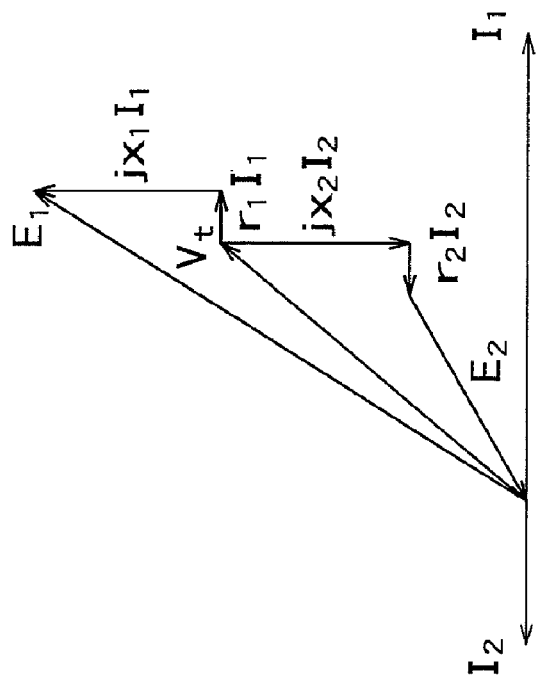
FIG. 3(a) is an equivalent circuit diagram of an example case where the synchronous rotating electric machine 1 of the superconductive rotating electric machine drive control of the embodiment shown in FIG. 1 is a synchronous motor.
FIG. 3(b) is a vector diagram of an example case where the synchronous rotating electric machine 1 of the superconductive rotating electric machine drive control of the embodiment shown in FIG. 1 is a synchronous motor.
Figure 3:
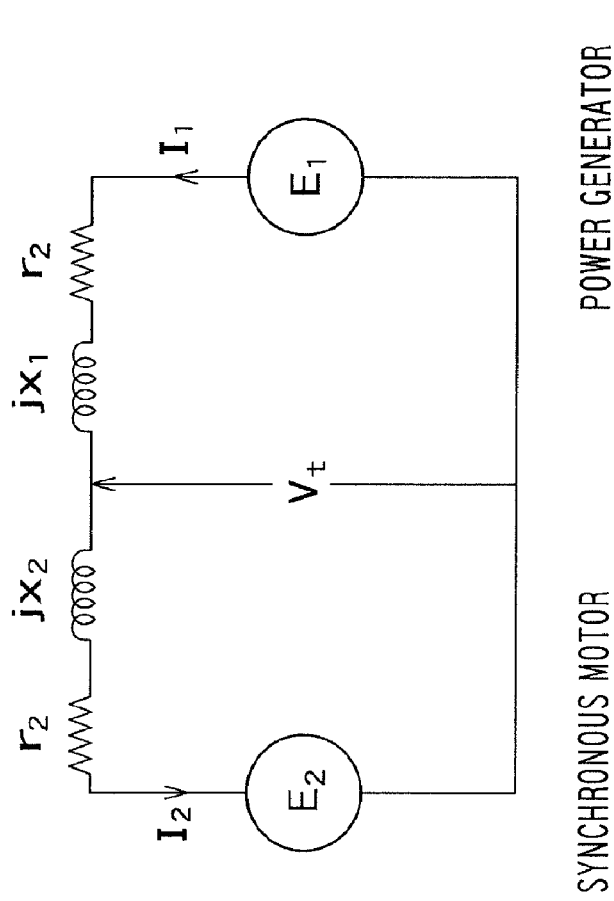
Figure 4:
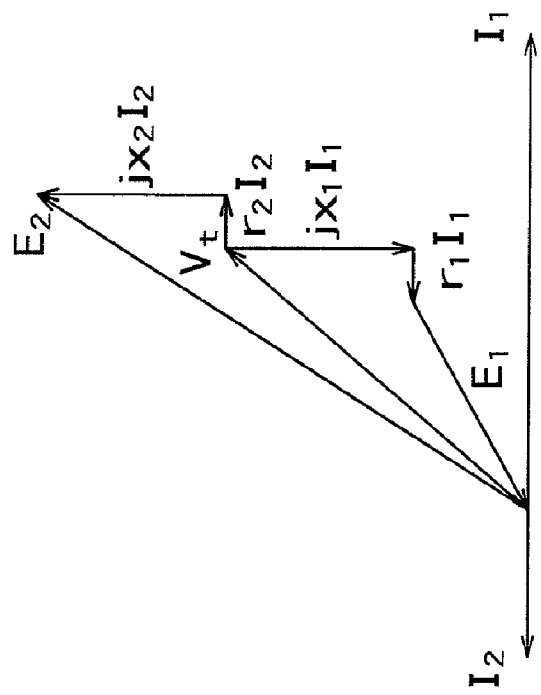
FIG. 4(a) is an equivalent circuit diagram of an example case where the synchronous rotating electric machine 1 of the superconductive rotating electric machine drive control of the embodiment shown in FIG. 1 is a synchronous power generator.
FIG. 4(b) is a vector diagram of an example case where the synchronous rotating electric machine 1 of the superconductive rotating electric machine drive control of the embodiment shown in FIG. 1 is a synchronous power generator.
Figure 4:
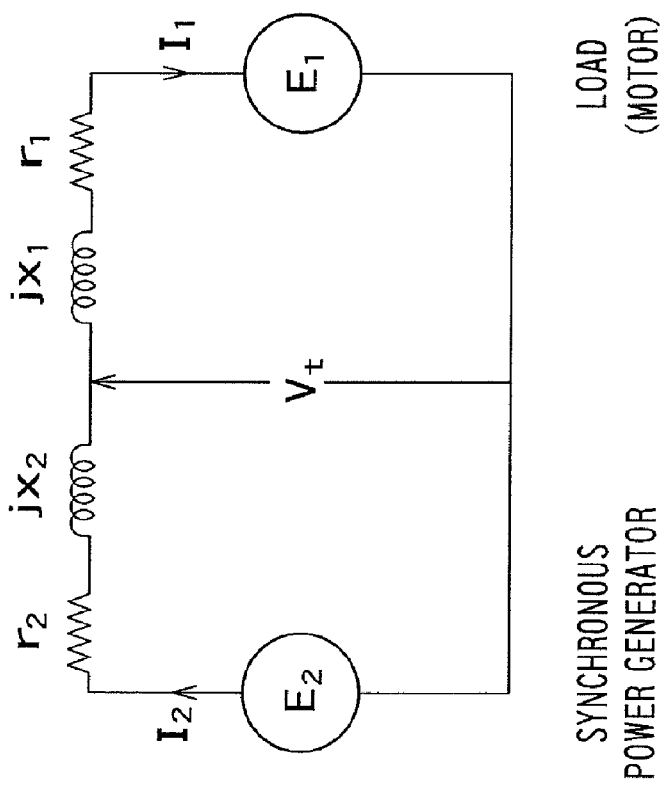
Figure 5:
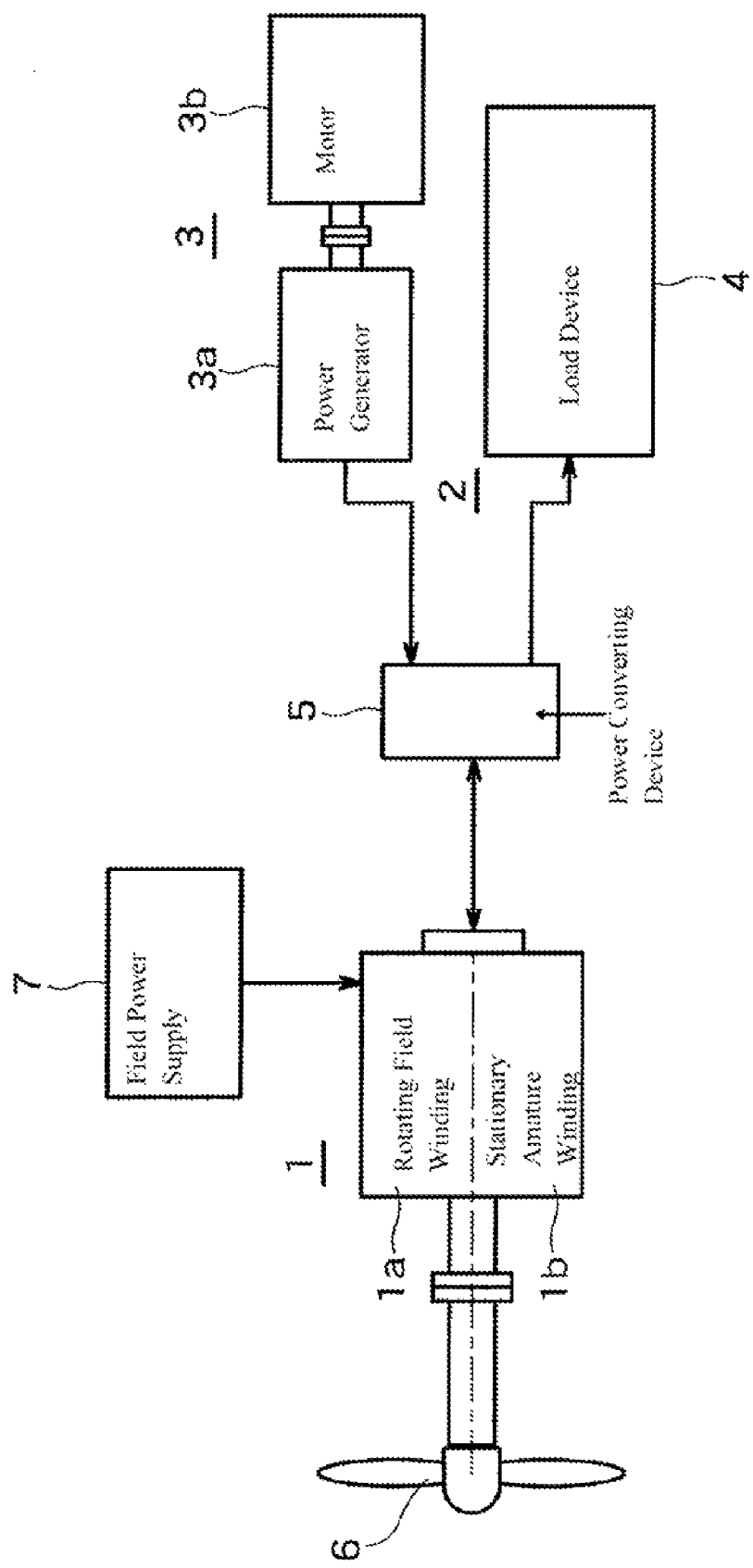
FIG. 5 is a block diagram showing the structure of an electric propulsion system provided in a super-eco ship.

FIG. 3(a) is an equivalent circuit diagram of a structure in which the synchronous rotating electric machine 1 of the superconductive rotating electric machine drive control system of the embodiment shown in FIG. 1 is a synchronous motor. FIG. 3(b) is a vector diagram of the same structure. FIG. 4(a) is an equivalent circuit diagram of a structure in which the synchronous rotating electric machine 1 is a synchronous power generator. FIG. 4(b) is a vector diagram of the same structure.

Referring now to FIGS. 3(a) and 3(b) and FIGS. 4(a) and 4(b), the principles of coordinated control performed by the unified controller 8 on the field current and the armature current in the superconductive rotating electric machine drive control system of this embodiment in which the superconductive rotating electric machine drive control method of this embodiment is implemented are described.

In the equivalent circuit diagram and the vector diagram of the synchronous motor case shown in FIGS. 3(a) and 3(b), the following equations are satisfied:

$$E_1 \cos(\theta+\delta_1) - r_1 I = V_t \cos\theta \quad (1)$$

$$E_1 \sin(\theta+\delta_1) - x_1 I = V_t \sin\theta \quad (2)$$

$$E_2 \cos(\theta-\delta_2) + r_2 I = V_t \cos\theta \quad (3)$$

$$E_2 \sin(\theta-\delta_2) + x_2 I = V_t \sin\theta \quad (4)$$

Here, $E_1$ and $E_2$ represent the induced electromotive forces of the power generator (the power generator 3c of FIG. 1) and the synchronous motor (the synchronous rotating electric machine 1 of FIG. 1), $V_t$ represents the terminal voltage, I ($=I_1=I_2$) represent the line current, $r_1$ and $\chi_1$ represent the resistance and the reactance of the power generator, $r_2$ and $\chi_2$ represent the resistance and the reactance of the synchronous motor, $\delta_1$ and $\delta_2$ represent the phase angles (=load angles) between the induced electromotive forces and the terminal voltages of the power generator and the synchronous motor, and $\theta$ represents the power factor angle.

The induced electromotive forces $E_1$ and $E_2$ of the synchronous motor and the power generator, the input power $P_i$ of the power generator, and the output power $R_o$ of the synchronous motor are expressed by the following equations:

$$E_1 = k_1 \Phi_1 v_1 = k_3 n_1 I_{f1} v_1 \quad (5)$$

$$E_2 = k_2 \Phi_2 v_2 = k_4 n_2 I_{f2} v_2 \quad (6)$$

$$P_i = 3V_t I \cos\theta + W_1 \quad (7)$$

$$P_o = 3V_t I \cos\theta - W_2 \quad (8)$$

Here, $k_1$, $k_2$, $k_3$, and $k_4$ represent the constants, $\Phi_1$ and $\Phi_2$ represent the effective field fluxes of the power generator and the synchronous motor, $n_1$ and $n_2$ represent the numbers of field winding wires in the power generator and the synchronous motor, $I_{f1}$ and $I_{f2}$ represent the field currents of the power generator and the synchronous motor, $v_1$ and $v_2$ represent the revolving speeds of the power generator and the synchronous motor ($v=v_1=v_2$), and $W_1$ and $W_2$ represent the total losses of the power generator and the synchronous motor ($W_1$=copper loss $r_1 I^2$+iron loss+mechanical loss+excitation loss+cooling power, $W_2$=copper loss $r_2 I^2$+iron loss+mechanical loss+excitation loss+cooling power).

Since the values of the terminal voltage $V_t$, the resistance $r_1$ and the reactance $\chi_1$ of the power generator, and the resistance $r_2$ and the reactance $\chi_2$ of the synchronous motor are given, there are six unknown values, $E_1$, $E_2$, I, $\theta$, $\delta_1$, and $\delta_2$, in the equations (1) through (4).

Normally, to achieve higher efficiency, the synchronous motor is controlled so that the induced electromotive force $E_2$ and the line current I are in phase ($\delta_2=\theta$), or the power factor becomes 100% ($\theta=0$). Since the line current I is determined by the load condition, there are actually four unknown values, $E_1$, $E_2$, $\delta_1$, and $\delta_2$.

Therefore, the field currents $I_{f1}$ and $I_{f2}$ of the synchronous power generator and the synchronous motor are determined by defining $E_1$ and $E_2$, and assigning the defined values to the equations (5) and (6). In other words, the field currents $I_{f1}$ and $I_{f2}$ of the synchronous power generator and the synchronous motor are coordinately controlled in accordance with the load condition, so that the synchronous motor can keep operating while maintaining the desired power factor $\theta$ and the load angle $\delta_2$, even when the load condition varies.

More specifically, if coordinated control is performed according to the later described equations (16) and (17), the induced electromotive force $E_2$ and the line current I can be always in phase ($\delta_2=\theta$).

Also, if coordinated control is performed according to the later described equations (18) and (19), the power factor can be always 100% ($\theta=0$).

In either case, it is possible to provide a superconductive rotating electric machine drive control system and a superconductive rotating electric machine drive control method that can control low-voltage, high-current power with a high power factor and at high efficiency.

The above facts are expressed as follows. First, the following equation is obtained from the equations (3) and (4):

$$(V_t \cos\theta - r_2 I)^2 + (V_t \sin\theta - x_2 I)^2 = E_2^2 \quad (9)$$

Also, the following equation is obtained from the equations (1) and (2):

$$(V_t \cos\theta + r_1 I)^2 + (V_t \sin\theta + x_1 I)^2 = E_1^2 \quad (10)$$

When the above equation is assigned to the equations (5) and (6), the following equations are satisfied:

$$I_{f2} = E_2/k_4 n_2 v = \sqrt{(V_t\cos\theta - r_2 I)^2 + (V_t\sin\theta - x_2 I)^2}/k_4 n_2 v \quad (11)$$

$$I_{f1} = E_1/k_3 n_1 v = \sqrt{(V_t\cos\theta + r_1 I)^2 + (V_t\sin\theta + x_1 I)^2}/k_3 n_1 v \quad (12)$$

The following is a detailed description of the coordinated control method that involves the unified controller 8 in the superconductive rotating electric machine drive control system of this embodiment in which the superconductive rotating electric machine drive control method of this embodiment is implemented in a case where the induced electromotive force and the line current I are in phase ($\delta_2=\theta$).

When $\delta_2=\theta$ is assigned to the equations (3) and (4), the following equations are obtained:

$$E_2+r_2I=V_t\cos\theta \qquad (13)$$

$$x_2I=V_t\sin\theta \qquad (14)$$

The following equation is obtained from the above two equations (13) and (14):

$$(E_2+r_2I)^2+x_2^2I^2=V_t^2 \qquad (15)$$

When this equation is modified and is assigned to the equation (6), the following equation is obtained:

$$I_{f2}=(\sqrt{V_t^2-x_2^2I^2}-r_2I)/k_4n_2v \qquad (16)$$

Furthermore, when the equations (13) and (14) are assigned to the equations (10) and (5), the following equation is satisfied:

$$I_{f1}=\sqrt{(E_t^2+(r_1+r_2)I)^2+(x_1+x_2)^2I^2}/k_3n_1v \qquad (17)$$

The following is a detailed description of the coordinated control method that involves the unified controller 8 in the superconductive rotating electric machine drive control system of this embodiment in which the superconductive rotating electric machine drive control method of this embodiment is implemented in a case where control is performed to achieve a power factor of 1 ($\theta=0$).

When $\theta=0$ is assigned to the equations (11) and (12), the following equations are obtained:

$$I_{f2}=E_2/k_4n_2v=\sqrt{(V_t-r_2I)^2+(-x_2I)^2}/k_4n_2v \qquad (18)$$

$$I_{f1}=E_1/k_3n_1v=\sqrt{(V_t+r_1I)^2+(x_1I)^2}/k_3n_1 \qquad (19)$$

The power factor $\theta$ can be sensed by detecting the terminal voltage $V_t$ and the line current I. The load angles $\delta_1$ and $\delta_2$ can be sensed by detecting the locations of the terminal voltage $V_t$ and the induced electromotive forces $E_1$ and $E_2$.

In a case where the synchronous rotating electric machine 1 is used as a synchronous power generator, the following two equations are established based on the equivalent circuit diagram of FIG. 4(a) and the vector diagram of FIG. 4(b):

$$E_2\cos(\theta-\delta_{12})+r_2I=V_t\cos\theta$$

$$E_2\sin(\theta+\delta_2)-x_2I=V_t\sin\theta$$

The following equation is obtained from the above two equations:

$$(V_t\cos\theta+r_2I)^2+(V_t\sin\theta+x_2I)^2=E_2^2$$

When this equation is assigned to the equation (6), the following equation is established:

$$I_{f2}=\sqrt{(V_t\cos\theta+r_2I)^2+(V_t\sin\theta+x_2I)^2}/k_4n_2v \qquad (20)$$

Accordingly, by performing control the field current of the synchronous power generator in accordance with the load state so as to satisfy the equation (20), the power factor angle $\theta$ can be maintained at a constant value during operation. Thus, it is possible to provide a superconductive rotating electric machine drive control system and a superconductive rotating electric machine drive control method that can control low-voltage, high-current power with a high power factor and at high efficiency.

When the superconductive rotating electric machine drive control system and the superconductive rotating electric machine drive control method of this embodiment are implemented in an electric propulsion system such as a ship electric propulsion system required to have low-speed large torque, the induced electromotive force accompanying the low speed can be compensated by a powerful superconductive field flux.

In a case where superconductive armature windings are used, the copper loss caused by an increase in the armature current is smaller, and much higher efficiency can be achieved.

FIG. 6(b) is a schematic block diagram showing the transmission efficiency of the superconductive rotating electric machine drive control system of this embodiment in which the superconductive rotating electric machine drive control method of this embodiment is implemented. In FIG. 6(b), each of the values having the symbol $\Delta$ attached thereto represents a loss (%), and each of the values not having the symbol $\Delta$ attached thereto represents transmission efficiency (%). In the superconductive rotating electric machine drive control system and the superconductive rotating electric machine drive control method of this embodiment, the transmission efficiency has the same value at a rated speed or a ½ vessel speed.

Even with the required power for the refrigerating unit 12 being taken into consideration, the transmission efficiency of an electric propulsion system employing the superconductive rotating electric machine drive control system of this embodiment in which the superconductive rotating electric machine drive control method of this embodiment is implemented has the values shown in FIG. 6(b). With the arrangement of this embodiment, a notable effect is achieved, as the transmission efficiency is approximately 10% higher during the rated operation and is approximately 26% higher at the ½ vessel speed, compared with the transmission efficiency observed in a case of a conventional electric propulsion system shown in FIG. 6(a). In the superconductive rotating electric machine drive control system of this embodiment having the unified controller 8 that performs control by the superconductive rotating electric machine drive control method of this embodiment so that the field current applied to the superconductive field winding 1c of the synchronous rotating electric machine 1 satisfies the equation (11) in accordance with the variation of the power exchanged between the synchronous rotating electric machine 1 and the power unit 2 or on the output variation, a superconductive coil for supplying a field current is provided on the side of the rotor, and an inductive power collector 9 of a rotary transformer type that variably adjusts the voltage is provided between the field power supply 7 and the field-side power converting device 10. With this structure, the field circuit in the rotor can be integrally made superconductive, and low-loss excitation and easy heat insulation can be realized. Thus, the armature structure can be simplified, and the required capacity of the refrigerating unit 12 can be made smaller.

If a direct current is supplied as the field current from the field power supply 7 to the rotary field winding (the superconductive field winding) 1c in the above structure having the inductive power collector 9, the power converting device (an AC/DC converting device) 10 is provided on the rotor side of the inductive power collector 9, since the inductive power collector 9 can supply only an alternating current.

If an alternating current is supplied as the field current from the field power supply 7 to the rotary field winding (the superconductive field winding) 1c in the above structure having the inductive power collector 9, the power converting device 10 such as a converter, an inverter, or a cyclo-converter is provided on the rotor side or the stator side. With this arrangement, the amount of field current can be readily controlled.

In the superconductive rotating electric machine drive control system of this embodiment having the unified controller 8 that performs a control operation by the superconductive rotating electric machine drive control method of this embodiment so that the field current applied to the superconductive field winding 1c of the synchronous rotating electric machine 1 satisfies the equation (11) in accordance with the output variation, the superconductive transformer 11 that includes a superconductive coil and variably adjusts the voltage is provided at an electric machine side spot between the synchronous rotating electric machine 1 and the power unit 2. With this structure, the armature voltage can be readily transformed, and the armature circuit can be integrally made superconductive. Also, low-loss excitation and easy heat insulation can be realized. Thus, the rotor structure can be simplified, and the required capacity of the refrigerating unit 12 can be made smaller.

The superconductive transformer 11 includes at least a superconductive winding or a superconductive coil as the winding provided on the side of the synchronous rotating electric machine 1. The winding on the side of the armature-side power converting device 5 may be either a superconductive winding or a copper winding.

In the above structure including the superconductive transformer 11, the power converting device 10 such as an inverter, a converter, or a cyclo-converter is provided on the rotating electric machine side or the power unit side of the superconductive transformer 11, so that the amount of armature current can be readily controlled.

In the superconductive rotating electric machine drive control system of this embodiment having the unified controller 8 that performs a control operation by the superconductive rotating electric machine drive control method of this embodiment so that the field current applied to the superconductive field winding 1c of the synchronous rotating electric machine 1 satisfies the equation (11) in accordance with the output variation, the propeller 6 is connected to the synchronous rotating electric machine 1, so that the system can be used for the ship propulsion, wind-power generation, and the likes. Thus, high-efficiency operation control with high power factor can be achieved.

In the superconductive rotating electric machine drive control system of this embodiment having the unified controller 8 that performs a control operation by the superconductive rotating electric machine drive control method of this embodiment so that the field current applied to the superconductive field winding 1c of the synchronous rotating electric machine 1 satisfies the equation (11) in accordance with the output variation, the synchronous rotating electric machine 1 is operated as a power generator, and the power unit 2 is used as a rotational or linear motor or as the load unit 4 of a hydrogen energy generating device or a general power supply device or the like. In this manner, this system can be used as the high-efficiency power supply device of a transportation/industrial system motor or a dispersed power and electric power generator or the like. Thus, this system can be used in wider fields.

In the superconductive rotating electric machine drive control system of this embodiment having the unified controller 8 that performs a control operation by the superconductive rotating electric machine drive control method of this embodiment so that the field current applied to the superconductive field winding 1c of the synchronous rotating electric machine 1 satisfies the equation (11) in accordance with the output variation, the synchronous rotating electric machine 1 is operated as a motor, and the power unit 2 is used as a power supply equipped with a power engine and a superconductive power generator. In this manner, this system can be used as a high-efficiency electric drive system. Thus, this system can be used in wider fields.

As described so far, the superconductive rotating electric machine drive control system of this embodiment includes the unified controller 8 that performs a control operation by the superconductive rotating electric machine drive control method of this embodiment so that the field current applied to the superconductive field winding 1c of the synchronous rotating electric machine 1 satisfies the equation (11) in accordance with the variation of the electric power exchanged between the synchronous rotating electric machine 1 and the power unit 2 or on the output variation. Accordingly, this embodiment can provide a small-sized, light-weight superconductive rotating electric machine drive control system that can constantly perform drive control on low-voltage large current with high power factor at high efficiency, regardless of changes in operating conditions such as load fluctuations.

By the superconductive rotating electric machine drive control method of this embodiment, a control operation is performed so that the field current applied to the superconductive field winding 1c of the synchronous rotating electric machine 1 satisfies the equation (11) in accordance with the variation of the electric power exchanged between the synchronous rotating electric machine 1 and the power unit 2 or on the output variation. Accordingly, this embodiment can provide a superconductive rotating electric machine drive control method for constantly performing drive control on low-voltage large current with high power factor at high efficiency, regardless of changes in operating conditions such as load fluctuations.

The invention claimed is:

1. A superconductive rotating electric machine drive control system comprising:
   a synchronous rotating electric machine that has a superconductive field winding and a copper armature winding or a superconductive armature winding;
   a power unit provided as a power supply unit that supplies power to the synchronous rotating electric machine or as a load unit that receives power from the synchronous rotating electric machine;
   an armature-side power converting device that converts electric power exchanged between the synchronous rotating electric machine and the power unit;
   a field power supply that supplies a field current to the synchronous rotating electric machine;
   a field-side power converting device that controls the current supplied from the field power supply to the superconductive field winding;
   an unified controller that coordinately controls a direct or alternating current flowing in the superconductive field winding and the copper armature winding or superconductive armature winding; and
   a refrigerating unit that cools down the superconductive field winding or both the superconductive field winding and the superconductive armature winding to a very low temperature,
   wherein, when the synchronous rotating electric machine is used as a synchronous motor, the unified controller performs a control operation so that a field current $I_{f2}$ applied to the superconductive field winding of the synchronous rotating electric machine satisfies the following equation (11) in accordance with a variation of the electric power exchanged between the synchronous rotating electric machine and the power unit:

$$I_{f2} = E_2/k_4 n_2 v = \sqrt{(V_t\cos\theta - r_2 I)^2 + (V_t\sin\theta - x_2 I)^2}/k_4 n_2 v \quad (11)$$

where $I_{f2}$ represents the field current applied to the superconductive field winding, I represents a line current, $E_2$ represents an induced electromotive force of the synchronous rotating electric machine, $V_t$ represents a terminal voltage, $k_4$ represents a constant, $n_2$ represents a number of winding wires in the superconductive field winding, ν represents a rotation speed of the synchronous rotating electric machine, θ represents a power factor angle, $r_2$ represents resistance of the synchronous rotating electric machine, and $\chi_2$ represent reactance of the synchronous rotating electric machine.

2. The superconductive rotating electric machine drive control system according to claim 1, wherein
the unified controller performs a control operation so that the field current $I_{f2}$ applied to the superconductive field winding satisfies the following equation (16):

$$I_{f2}=(\sqrt{V_t^2-x_2^2 I^2}-r_2 I)/k_4 n_2 \nu \tag{16}$$

the equation (16) being satisfied so that the induced electromotive force $E_2$ of the synchronous rotating electric machine and an armature current I flowing in the copper armature winding or superconductive armature winding are always in phase.

3. The superconductive rotating electric machine drive control system according to claim 1, wherein
the unified controller performs a control operation so that the field current $I_{f2}$ applied to the superconductive field winding satisfies the following equation (18):

$$I_{f2}=E_2/k_4 n_2 \nu=\sqrt{(V_t-r_2 I)^2+(-x_2 I)^2}/k_4 n_2 \nu \tag{18}$$

the equation (18) being satisfied so that a power factor of the synchronous rotating electric machine is always 1 (cos θ=1).

4. The superconductive rotating electric machine drive control system according to claim 1, wherein the power supply unit is formed with a copper power generator or a superconductive power generator and a power engine connected to each other.

5. The superconductive rotating electric machine drive control system according to claim 1, further comprising
a superconductive transformer that has at least a superconductive winding as a winding on the synchronous rotating electric machine side, and variably adjusts voltage, the superconductive transformer being placed between the synchronous rotating electric machine and the armature-side power converting device.

6. The superconductive rotating electric machine drive control system according to claim 5, further comprising
a power converting device that includes an inverter, a converter, or a cyclo-converter, the power converting device being placed on the synchronous rotating electric machine side of the superconductive transformer or on an opposite side of the superconductive transformer from the synchronous rotating electric machine side.

7. The superconductive rotating electric machine drive control system according to claim 1, further comprising
an inductive power collector that has a superconductive coil on a rotor side, and includes a rotary transformer that variably adjusts voltage, the inductive power collector being placed between the field power supply and the field-side power converting device.

8. The superconductive rotating electric machine drive control system according to claim 7, further comprising
a power converting device that includes an inverter, a converter, or a cyclo-converter, the power converting device being placed on a rotor or stator side of the inductive power collector.

9. The superconductive rotating electric machine drive control system according to claim 8, wherein the power converting device provided on the rotor side of the inductive power collector is an AC/DC converter.

10. The superconductive rotating electric machine drive control system according to claim 1, further comprising
a propeller that is connected to the synchronous rotating electric machine.

11. A superconductive rotating electric machine drive control system comprising:
a synchronous rotating electric machine that has a superconductive field winding and a copper armature winding or a superconductive armature winding;
a power unit provided as a power supply unit that supplies power to the synchronous rotating electric machine or as a load unit that receives power from the synchronous rotating electric machine;
an armature-side power converting device that converts electric power exchanged between the synchronous rotating electric machine and the power unit;
a field power supply that supplies a field current to the synchronous rotating electric machine;
a field-side power converting device that controls the current supplied from the field power supply to the superconductive field winding;
an unified controller that coordinately controls a direct or alternating current flowing in the superconductive field winding and the copper armature winding or superconductive armature winding; and
a refrigerating unit that cools down the superconductive field winding or both the superconductive field winding and the superconductive armature winding to a very low temperature,
wherein, when the synchronous rotating electric machine is used as a synchronous motor, the unified controller performs a control operation so that field currents $I_{f1}$ and $I_{f2}$ respectively applied to a field winding of the power supply unit and the superconductive field winding of the synchronous rotating electric machine satisfy the following equations (11) and (12) in accordance with a variation of the electric power exchanged between the synchronous rotating electric machine and the power unit:

$$I_{f2}=E_2/k_4 n_2 \nu=\sqrt{(V_t\cos\theta-r_2 I)^2+(V_t\sin\theta-x_2 I)^2}/k_4 n_2 \nu \tag{11}$$

$$I_{f1}=E_1/k_3 n_1 \nu=\sqrt{(V_t\cos\theta+r_2 I)^2+(V_t\sin\theta+x_2 I)^2}/k_3 n_1 \nu \tag{12}$$

where $I_{f1}$ and $I_{f2}$ represent the field currents respectively applied to the field winding of the power supply unit and the superconductive field winding of the synchronous rotating electric machine, I represents a line current, $E_1$ and $E_2$ represent induced electromotive forces of the power supply unit and the synchronous rotating electric machine, $V_t$ represents a terminal voltage, $k_3$ and $k_4$ represent constants, $n_1$ and $n_2$ represent numbers of winding wires in the field winding of the power supply unit and the superconductive field winding of the synchronous rotating electric machine, ν represents a rotation speed of the synchronous rotating electric machine, θ represents a power factor angle, $r_1$ and $r_2$ respectively represent resistance of the power supply unit and resistance of the synchronous rotating electric machine, and $\chi_1$ and $\chi_2$ respectively represent reactance of the power supply unit and reactance of the synchronous rotating electric machine.

12. The superconductive rotating electric machine drive control system according to claim 11, wherein
the unified controller performs a control operation so that the field currents $I_{f1}$ and $I_{f2}$ respectively applied to the field winding of the power supply unit and the superconductive field winding of the synchronous rotating electric machine satisfy the following equations (16) and (17):

$$I_{f2}=(\sqrt{V_t^2-x_2^2 I^2}-r_2 I)/k_4 n_2 v \qquad (16)$$

$$I_{f1}=\sqrt{(E_t^2+(r_1+r_2)I)^2+(x_1+x_2)^2 I^2}/k_3 n_1 v \qquad (17)$$

the equations (16) and (17) being satisfied so that the induced electromotive force $E_2$ of the synchronous rotating electric machine and an armature current I flowing in the copper armature winding or superconductive armature winding are always in phase.

13. The superconductive rotating electric machine drive control system according to claim 11, wherein
the unified controller performs a control operation so that the field currents $I_{f2}$ and $I_{f2}$ respectively applied to the field winding of the power supply unit and the superconductive field winding of the synchronous rotating electric machine satisfy the following equations (18) and (19):

$$I_{f2}=E_2/k_4 n_2 v=\sqrt{(V_t-r_2 I)^2+(-x_2 I)^2}/k_4 n_2 v \qquad (18)$$

$$I_{f1}=E_1/k_3 n_1 v=\sqrt{(V_t+r_1 I)^2+(x_1 I)^2}/k_3 n_1 \qquad (19)$$

the equations (18) and (19) being satisfied so that a power factor of the synchronous rotating electric machine is always 1 (cos θ=1).

14. The superconductive rotating electric machine drive control system according to claim 11, wherein the power supply unit is formed with a copper power generator or a superconductive power generator and a power engine connected to each other.

15. The superconductive rotating electric machine drive control system according to claim 11, further comprising
a superconductive transformer that has at least a superconductive winding as a winding on the synchronous rotating electric machine side, and variably adjusts voltage, the superconductive transformer being placed between the synchronous rotating electric machine and the armature-side power converting device.

16. The superconductive rotating electric machine drive control system according to claim 15, further comprising
a power converting device that includes an inverter, a converter, or a cyclo-converter, the power converting device being placed on the synchronous rotating electric machine side of the superconductive transformer or on an opposite side of the superconductive transformer from the synchronous rotating electric machine side.

17. The superconductive rotating electric machine drive control system according to claim 11, further comprising
an inductive power collector that has a superconductive coil on a rotor side, and includes a rotary transformer that variably adjusts voltage, the inductive power collector being placed between the field power supply and the field-side power converting device.

18. The superconductive rotating electric machine drive control system according to claim 17, further comprising
a power converting device that includes an inverter, a converter, or a cyclo-converter, the power converting device being placed on a rotor or stator side of the inductive power collector.

19. The superconductive rotating electric machine drive control system according to claim 18, wherein the power converting device provided on the rotor side of the inductive power collector is an AC/DC converter.

20. The superconductive rotating electric machine drive control system according to claim 11, further comprising
a propeller that is connected to the synchronous rotating electric machine.

21. A superconductive rotating electric machine drive control system comprising:
a synchronous rotating electric machine that has a superconductive field winding and a copper armature winding or a superconductive armature winding;
a power unit provided as a power supply unit that supplies power to the synchronous rotating electric machine or as a load unit that receives power from the synchronous rotating electric machine;
an armature-side power converting device that converts electric power exchanged between the synchronous rotating electric machine and the power unit;
a field power supply that supplies a field current to the synchronous rotating electric machine;
a field-side power converting device that controls the current supplied from the field power supply to the superconductive field winding;
an unified controller that coordinately controls a direct or alternating current flowing in the superconductive field winding and the copper armature winding or superconductive armature winding; and
a refrigerating unit that cools down the superconductive field winding or both the superconductive field winding and the superconductive armature winding to a very low temperature,
wherein, when the synchronous rotating electric machine is used as a power generator, the unified controller performs a control operation so that a field current $I_{f2}$ applied to the superconductive field winding satisfies the following equation (20) in accordance with a variation of the electric power exchanged between the synchronous rotating electric machine and the power unit:

$$I_{f2}=\sqrt{(V_t\cos\theta+_2 I)^2+(V_t\sin\theta+x_2 I)^2}/k_4 n_2 v \qquad (20)$$

where $I_{f2}$ represents the field current applied to the superconductive field winding, I represents a line current, $V_t$ represents a terminal voltage, $k_4$ represents a constant, $n_2$ represents a number of winding wires in the superconductive field winding, v represents a rotation speed of the synchronous rotating electric machine, θ represents a power factor angle, $r_2$ represents resistance of the synchronous rotating electric machine, and $\chi_2$ represent reactance of the synchronous rotating electric machine.

22. The superconductive rotating electric machine drive control system according to claim 21, wherein the power supply unit is formed with a copper power generator or a superconductive power generator and a power engine connected to each other.

23. The superconductive rotating electric machine drive control system according to claim 21, further comprising
a superconductive transformer that has at least a superconductive winding as a winding on the synchronous rotating electric machine side, and variably adjusts voltage, the superconductive transformer being placed between the synchronous rotating electric machine and the armature-side power converting device.

24. The superconductive rotating electric machine drive control system according to claim 23, further comprising
a power converting device that includes an inverter, a converter, or a cyclo-converter, the power converting device being placed on the synchronous rotating electric machine side of the superconductive transformer or on an opposite side of the superconductive transformer from the synchronous rotating electric machine side.

25. The superconductive rotating electric machine drive control system according to claim 21, further comprising
an inductive power collector that has a superconductive coil on a rotor side, and includes a rotary transformer that variably adjusts voltage, the inductive power collector being placed between the field power supply and the field-side power converting device.

26. The superconductive rotating electric machine drive control system according to claim 25, further comprising
a power converting device that includes an inverter, a converter, or a cyclo-converter, the power converting device being placed on a rotor or stator side of the inductive power collector.

27. The superconductive rotating electric machine drive control system according to claim 26, wherein the power converting device provided on the rotor side of the inductive power collector is an AC/DC converter.

28. The superconductive rotating electric machine drive control system according to claim 21, further comprising
a propeller that is connected to the synchronous rotating electric machine.

29. A superconductive rotating electric machine drive control method that is implemented in a superconductive rotating electric machine drive control system, the superconductive rotating electric machine drive control system including:
a synchronous rotating electric machine that has a superconductive field winding and a copper armature winding or a superconductive armature winding;
a power unit provided as a power supply unit that supplies power to the synchronous rotating electric machine or as a load unit that receives power from the synchronous rotating electric machine;
an armature-side power converting device that converts electric power exchanged between the synchronous rotating electric machine and the power unit;
a field power supply that supplies a field current to the synchronous rotating electric machine;
a field-side power converting device that controls the current supplied from the field power supply to the superconductive field winding;
an unified controller that coordinately controls a direct or alternating current flowing in the superconductive field winding and the copper armature winding or superconductive armature winding; and
a refrigerating unit that cools down the superconductive field winding or both the superconductive field winding and the superconductive armature winding to a very low temperature,
the superconductive rotating electric machine drive control method comprising:
performing a control operation with the use of the unified controller, when the synchronous rotating electric machine is used as a synchronous motor, so that a field current $I_{f2}$ applied to the superconductive field winding of the synchronous rotating electric machine satisfies the following equation (11) in accordance with a variation of the electric power exchanged between the synchronous rotating electric machine and the power unit:

$$I_{f2}=E_2/k_4 n_2 \nu = \sqrt{(V_t\cos\theta - r_2 I)^2 + (V_t\sin\theta - x_2 I)^2}/k_4 n_2 \nu \qquad (11)$$

where $I_{f2}$ represents the field current applied to the superconductive field winding, I represents a line current, $E_2$ represents an induced electromotive force of the synchronous rotating electric machine, $V_t$ represents a terminal voltage, $k_4$ represents a constant, $n_2$ represents a number of winding wires in the superconductive field winding, $\nu$ represents a rotation speed of the synchronous rotating electric machine, $\theta$ represents a power factor angle, $r_2$ represents resistance of the synchronous rotating electric machine, and $x_2$ represent reactance of the synchronous rotating electric machine.

30. The superconductive rotating electric machine drive control method according to claim 29, wherein
the performing a control operation with the use of the unified controller includes performing a control operation so that the field current $I_{f2}$ applied to the superconductive field winding satisfies the following equation (16):

$$I_{f2}=(\sqrt{V_t^2 - x_2^2 I^2} - r_2 I)/k_4 n_2 \nu \qquad (16)$$

the equation (16) being satisfied so that the induced electromotive force $E_2$ of the synchronous rotating electric machine and an armature current I flowing in the copper armature winding or superconductive armature winding are always in phase.

31. The superconductive rotating electric machine drive control method according to claim 29, wherein
the performing a control operation with the use of the unified controller includes performing a control operation so that the field current $I_{f2}$ applied to the superconductive field winding satisfies the following equation (18):

$$I_{f2}=E_2/k_4 n_2 \nu = \sqrt{(V_t - r_2 I)^2 + (-x_2 I)^2}/k_4 n_2 \nu \qquad (18)$$

the equation (18) being satisfied so that a power factor of the synchronous rotating electric machine is always 1 ($\cos\theta = 1$).

32. A superconductive rotating electric machine drive control method that is implemented in a superconductive rotating electric machine drive control system, the superconductive rotating electric machine drive control system including:
a synchronous rotating electric machine that has a superconductive field winding and a copper armature winding or a superconductive armature winding;
a power unit provided as a power supply unit that supplies power to the synchronous rotating electric machine or as a load unit that receives power from the synchronous rotating electric machine;
an armature-side power converting device that converts electric power exchanged between the synchronous rotating electric machine and the power unit;
a field power supply that supplies a field current to the synchronous rotating electric machine;
a field-side power converting device that controls the current supplied from the field power supply to the superconductive field winding;
an unified controller that coordinately controls a direct or alternating current flowing in the superconductive field winding and the copper armature winding or superconductive armature winding; and a refrigerating unit that cools down the superconductive field winding or both the superconductive field winding and the superconductive armature winding to a very low temperature, the superconductive rotating electric machine drive control method comprising:

performing a control operation with the use of the unified controller, when the synchronous rotating electric machine is used as a synchronous motor, so that field currents $I_{f1}$ and $I_{f2}$ respectively applied to a field winding of the power supply unit and the superconductive field winding of the synchronous rotating electric machine satisfy the following equations (11) and (12) in accordance with a variation of the electric power exchanged between the synchronous rotating electric machine and the power unit:

$$I_{f2}=E_2/k_4 n_2 v = \sqrt{(V_t \cos\theta - r_2 I)^2 + (V_t \sin\theta - x_2 I)^2}/k_4 n_2 v \tag{11}$$

$$I_{f1}=E_1/k_3 n_1 v = \sqrt{(V_t \cos\theta + r_2 I)^2 + (V_t \sin\theta + x_2 I)^2}/k_3 n_1 v \tag{12}$$

where $I_{f1}$ and $I_{f2}$ represent the field currents respectively applied to the field winding of the power supply unit and the superconductive field winding the synchronous rotating electric machine, I represents a line current, $E_1$ and $E_2$ represent induced electromotive forces of the power supply unit and the synchronous rotating electric machine, $V_t$ represents a terminal voltage, $k_3$ and $k_4$ represent constants, $n_1$ and $n_2$ represent numbers of winding wires in the field winding of the power supply unit and the superconductive field winding of the synchronous rotating electric machine, v represents a rotation speed of the synchronous rotating electric machine, θ represents a power factor angle, $r_1$ and $r_2$ respectively represent resistance of the power supply unit and resistance of the synchronous rotating electric machine, and $\chi_1$ and $\chi_2$ respectively represent reactance of the power supply unit and reactance of the synchronous rotating electric machine.

33. The superconductive rotating electric machine drive control method according to claim 32, wherein the performing a control operation with the use of the unified controller includes performing a control operation so that the field currents $I_{f1}$ and $I_{f2}$ respectively applied to the field winding of the power supply unit and the superconductive field winding of the synchronous rotating electric machine satisfy the following equations (16) and (17):

$$I_{f2}=(\sqrt{V_t^2 - x_2^2 I^2} - r_2 I)/k_4 n_2 v \tag{16}$$

$$I_{f1}=\sqrt{(E_2 + (r_1+r_2)I)^2 + (x_1+x_2)^2 I^2}/k_3 n_1 v \tag{17}$$

the equations (16) and (17) being satisfied so that the induced electromotive force $E_2$ of the synchronous rotating electric machine and an armature current I flowing in the copper armature winding or superconductive armature winding are always in phase.

34. The superconductive rotating electric machine drive control method according to claim 32, wherein the performing a control operation with the use of the unified controller includes performing a control operation so that the field currents $I_{f1}$ and $I_{f2}$ respectively applied to the field winding of the power supply unit and the superconductive field winding of the synchronous rotating electric machine satisfy the following equations (18) and (19):

$$I_{f2}=E_2/k_4 n_2 v = \sqrt{(V_t - r_2 I)^2 + (-x_2 I)^2}/k_4 n_2 v \tag{18}$$

$$I_{f1}=E_1/k_3 n_1 v = \sqrt{(V_t + r_1 I)^2 + (x_1 I)^2}/k_3 n_1 \tag{19}$$

the equations (18) and (19) being satisfied so that a power factor of the synchronous rotating electric machine is always 1 (cos θ=1).

35. A superconductive rotating electric machine drive control method that is implemented in a superconductive rotating electric machine drive control system, the superconductive rotating electric machine drive control system including:

a synchronous rotating electric machine that has a superconductive field winding and a copper armature winding or a superconductive armature winding;

a power unit provided as a power supply unit that supplies power to the synchronous rotating electric machine or as a load unit that receives power from the synchronous rotating electric machine;

an armature-side power converting device that converts electric power exchanged between the synchronous rotating electric machine and the power unit;

a field power supply that supplies a field current to the synchronous rotating electric machine;

a field-side power converting device that controls the current supplied from the field power supply to the superconductive field winding;

an unified controller that coordinately controls a direct or alternating current flowing in the superconductive field winding and the copper armature winding or superconductive armature winding; and a refrigerating unit that cools down the superconductive field winding or both the superconductive field winding and the superconductive armature winding to a very low temperature, the superconductive rotating electric machine drive control method comprising:

performing a control operation with the use of the unified controller, when the synchronous rotating electric machine is used as a power generator, so that a field current $I_{f2}$ applied to the superconductive field winding satisfies the following equation (20) in accordance with a variation of the electric power exchanged between the synchronous rotating electric machine and the power unit:

$$I_{f2}=\sqrt{(V_t \cos\theta + 2 I)^2 + (V_t \sin\theta + x_2 I)^2}/k_4 n_2 v \tag{20}$$

where $I_{f2}$ represents the field current applied to the superconductive field winding, I represents a line current, $V_t$ represents a terminal voltage, $k_4$ represents a constant, $n_2$ represents a number of winding wires in the superconductive field winding, v represents a rotation speed of the synchronous rotating electric machine, θ represents a power factor angle, $r_2$ represents resistance of the synchronous rotating electric machine, and $\chi_2$ represent reactance of the synchronous rotating electric machine.

* * * * *